(12) United States Patent
Jee et al.

(10) Patent No.: US 9,098,187 B2
(45) Date of Patent: Aug. 4, 2015

(54) MOBILE TERMINAL AND CONTROLLING METHOD THEREOF

(75) Inventors: Hyunho Jee, Seoul (KR); Ahyun Park, Seoul (KR); Doyoung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 272 days.

(21) Appl. No.: 13/537,151

(22) Filed: Jun. 29, 2012

(65) Prior Publication Data

US 2013/0002585 A1    Jan. 3, 2013

(30) Foreign Application Priority Data

Jul. 1, 2011    (KR) .................. 10-2011-0065515

(51) Int. Cl.
G06F 3/041    (2006.01)
G06F 3/048    (2013.01)
H04B 1/38    (2006.01)
G06F 3/0488    (2013.01)
G06F 3/0483    (2013.01)
G06F 3/0485    (2013.01)
G06F 17/30    (2006.01)

(52) U.S. Cl.
CPC ............ *G06F 3/0488* (2013.01); *G06F 3/0483* (2013.01); *G06F 3/0485* (2013.01); *G06F 17/30716* (2013.01)

(58) Field of Classification Search
CPC ... G06F 3/0483; G06F 15/0291; G06F 15/02; G06F 15/0283
USPC .................................. 345/156–178; 715/776
See application file for complete search history.

(56) References Cited

U.S. PATENT DOCUMENTS

| | | | | |
|---|---|---|---|---|
| 5,696,982 | A | * 12/1997 | Tanigawa et al. ............. | 715/236 |
| 2008/0318635 | A1 | * 12/2008 | Yoon et al. .................... | 455/566 |
| 2012/0124505 | A1 | * 5/2012 | St. Jacques, Jr. ............. | 715/776 |

* cited by examiner

*Primary Examiner* — Alexander Eisen
*Assistant Examiner* — Amit Chatly
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a display unit including a touchscreen; and a controller configured to display on the display unit a log information region representing page edges of an e-book executed on the mobile terminal, determine a variable characteristic of the executed e-book including at least one of 1) a number of times prescribed pages of the e-book have been displayed, and 2) an amount of time spent displaying the prescribed pages of the e-book, and distinctively mark the page edges of the e-book in accordance with the determined variable characteristic of the executed e-book.

20 Claims, 17 Drawing Sheets

(a)

(b)

(a)

(b)

(c)

MOBILE TERMINAL AND CONTROLLING METHOD THEREOF

Pursuant to 35 U.S.C. §119(a), this application claims the benefit of earlier filing date and right of priority to Korean Patent Application No. 10-2011-0065515, filed on Jul. 1, 2011, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for providing various kinds of functions using log information of an e-book.

2. Discussion of the Related Art

Generally, terminals can be classified into mobile/portable terminals and stationary terminals. The mobile terminals can be further classified into handheld terminals and vehicle mount terminals according to possibility of user's direct portability.

As functions of the terminal are becoming more diversified, the terminal is implemented as a multimedia player provided with composite functions such as photographing of photos or videos, playback of music or video files, game play, broadcast reception and the like for example.

Recently, an e-book reading function is included in a mobile terminal. In this instance, the e-book is a special format of a file that can be viewed via a portable device (e.g., mobile phone, PMP, PDA, etc.). In general, an e-book means a special format of a file in which a DRM function is loadable for copyright protection rather than such a universal file format as a text file. Despite a difference in a display type of an e-book on a mobile terminal, the e-book may support a memo function, a lining function, a search function and/or the like. However, these functions are limited.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a user can read an e-book mode conveniently.

Another object of the present invention is to provide a mobile terminal and controlling method thereof, by which a user can be informed on an e-book reading history as visual information of various types.

A further object of the present invention is to provide a mobile terminal and controlling method thereof, by which contents of an e-book can be conveniently re-sorted or re-arranged in accordance with an e-book reading history.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention may include a touchscreen configured to recognize a touch input and a controller creating at least one log information by a prescribed unit configuring an e-book while the e-book is displayed on the touchscreen, the controller, if a $1^{st}$ command input is applied, controlling an image to be displayed on a $1^{st}$ region of the touchscreen, wherein a visual effect corresponding to at least one of at least one log information value is given to the image by the prescribed unit.

In another aspect of the present invention, a method of controlling a mobile terminal may include the steps of gathering at least one log information for each unit configuring an e-book, entering a log information reading mode in accordance with a $1^{st}$ command input, and displaying an image on a $1^{st}$ region of a touchscreen, wherein a visual effect corresponding to at least one of at least one log information value is given to the each unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof;

and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Various types of terminals may be implemented using the techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, and the like. By way of non-limiting example only, further description will be with regard to a mobile terminal 100, and such teachings may apply equally to other types of terminals.

Figure 1:
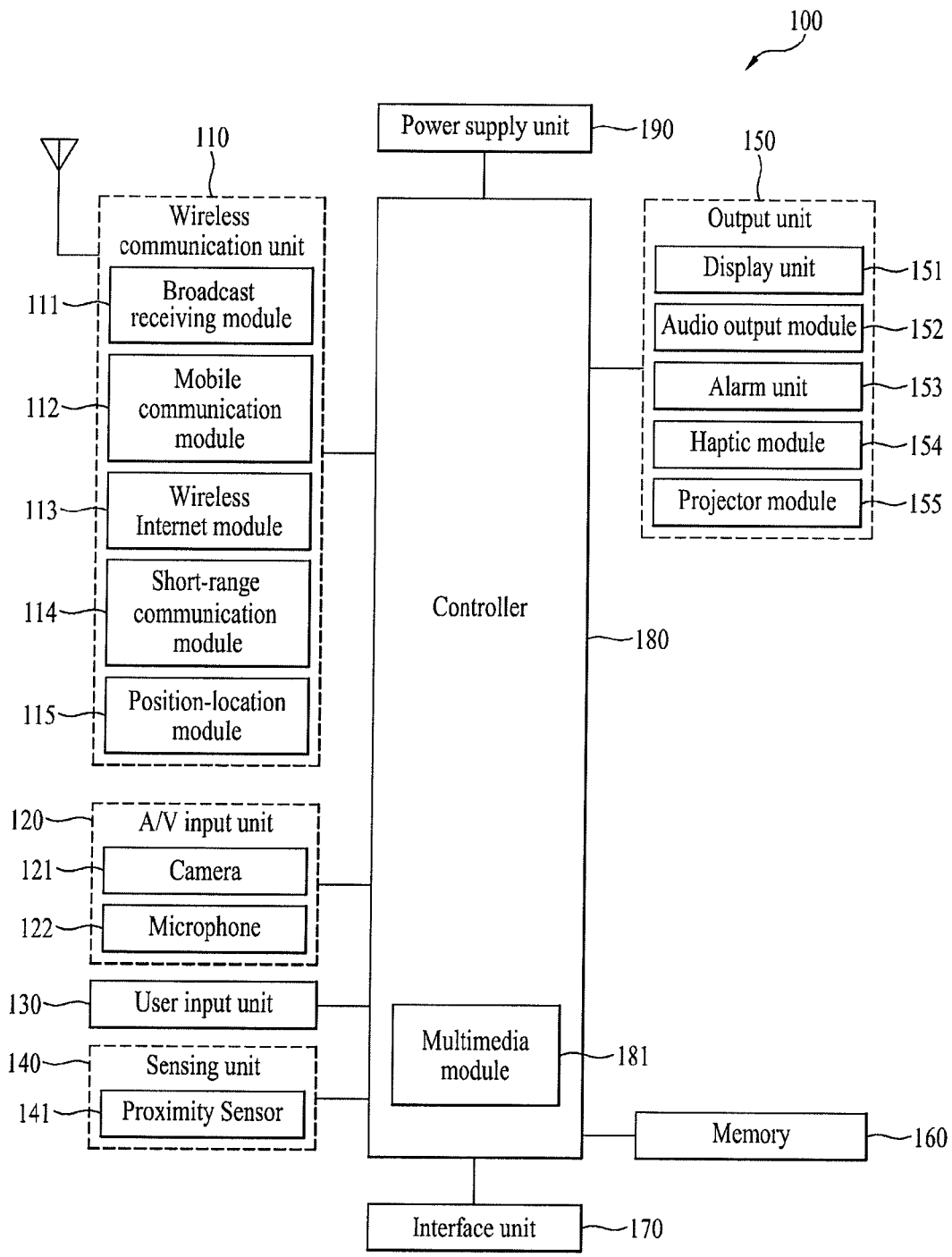
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 having a wireless communication unit 110, an A/V (audio/video) input unit 120, a user input unit 130, a sensing unit 140, an output unit 150, a memory 160, an interface unit 170, a controller 180, a power supply unit 190, among other components. Mobile terminal 100 is shown having various components, but it is understood that implementing all of the illustrated components is not a requirement as greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115, and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. This broadcast associated information can also be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring still to FIG. 1, the audio/video (A/V) input unit 120 is shown configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Typically, the processed image frames can be displayed on the display 151.

The image frames processed by the camera 121 can be stored in the memory 160 or can be externally transmitted via the wireless communication unit 110. Optionally, two or more cameras 121 can be provided to the mobile terminal 100 according to the environment in which the terminal used to according to user needs.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. If desired, the sensing unit 140 can include a proximity sensor 141.

The output unit 150 generates outputs relevant to the senses of sight, hearing, touch and the like. In some cases, the output unit 150 includes the display 151, an audio output module 152, an alarm unit 153, a haptic module 154, a projector module 155, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

When the display 151 and a sensor for detecting a touch action (hereinafter also referred to a 'touch sensor') configures a mutual layer structure (hereinafter also referred to a 'touchscreen'), the user can use the display 151 as an input device as well as an output device. In this instance, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signals) corresponding to the touch is transferred to a touch controller. The touch controller processes the signal(s) and then transfers the processed signals) to the controller 180. Therefore, the controller 180 is able to know whether a prescribed portion of the display 151 is touched.

With continued reference to FIG. 1, a proximity sensor 141 can be provided to an internal area of the mobile terminal 100 enclosed by the touchscreen or proximate to the touchscreen. The proximity sensor 141 is a sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like. When the touchscreen includes the electrostatic capacity proximity sensor, it may also be configured to detect the proximity of a pointer using a variation of electric field according to the proximity of the pointer. In this scenario, the touchscreen (touch sensor) can be classified as a proximity sensor.

In the following description, for clarity, an action that a pointer approaches without contacting with the touchscreen to be recognized as located on the touchscreen is referred to as 'proximity touch' while an action that a pointer actually touches the touchscreen may be referred to as a 'contact touch'. The meaning of the position on the touchscreen proximity-touched by the pointer refers to the position of the pointer which vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. In addition, the projector module 155 is able to display an image, which is identical to or partially different at least from the image displayed on the display 151, on an external screen or wall according to a control signal of the controller 180.

In particular, the projector module 155 can include a light source generating light (e.g., laser) for projecting an image externally, an image producing element for producing an image to output externally using the light generated from the light source, and a lens for enlarging the image for output externally at predetermined focus distance. The projector module 155 can further include a device for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. It is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 is able to operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such feature may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
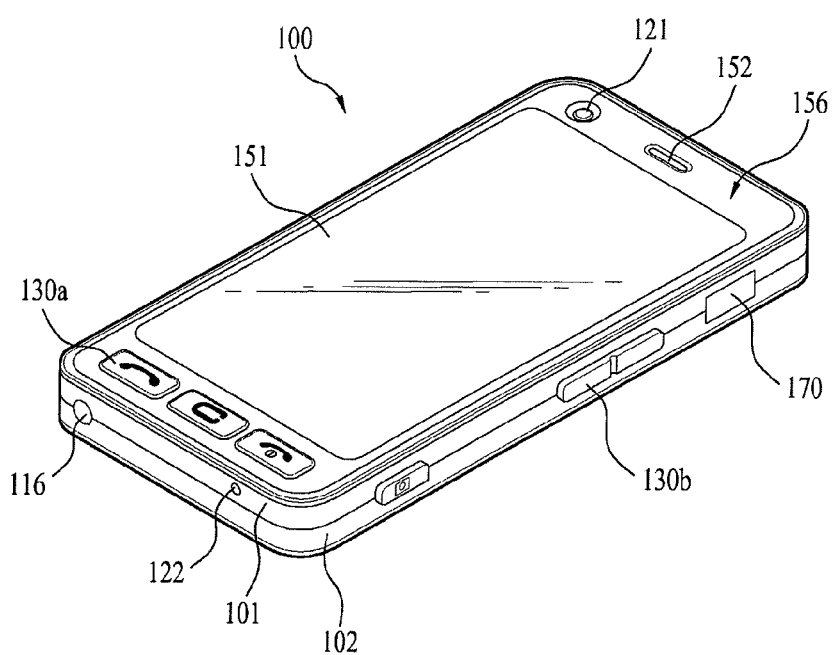
FIG. 2 is a front perspective diagram of a mobile terminal according to one embodiment of the present invention.

FIG. 2 is a front perspective diagram of a mobile terminal according to various embodiments of the present invention. The mobile terminal 100 is shown as a bar type terminal body, but the mobile terminal may alternative be implemented using other configuration such as folder-type, slide-type, rotational-type, swing-type, combinations thereof, and the like. For clarity, further disclosure will primarily relate to a bar-type mobile terminal 100, but such teachings apply equally to other types of mobile terminals.

Referring still to FIG. 2, the mobile terminal 100 includes a case (casing, housing, cover, etc.) configuring an exterior thereof. The case is shown divided into a front case 101 and a rear case 102. Various electric/electronic parts are positioned or otherwise located in a space or cavity provided between the front and rear cases 101 and 102. Optionally, at least one middle case can be further provided between the front and rear cases 101 and 102. The cases 101 and 102 may be formed by injection molding of synthetic resin or they can be formed of metal substance such as stainless steel (STS), titanium (Ti) or the like, for example.

A display 151, an audio output unit 152, a camera 121, user input units 130/131 and 132, a microphone 122, an interface 180 and the like can be provided to the terminal body, and more particularly, to the front case 101.

The display 151 is shown occupying the majority of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. The input unit 130 may also include a plurality of manipulating units 131 and 132. The manipulating units 131 and 132 will sometimes be referred to herein as a manipulating portion and they may implement any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. A command for volume adjustment of sound output from the audio output unit 152, a command for switching to a touch recognizing mode of the display 151 or the like can be input to the second manipulating unit 132.

Interconnected operational mechanism between the display 151 and the touchpad 135 are explained with reference to FIG. 3 as follows.

Figure 3:
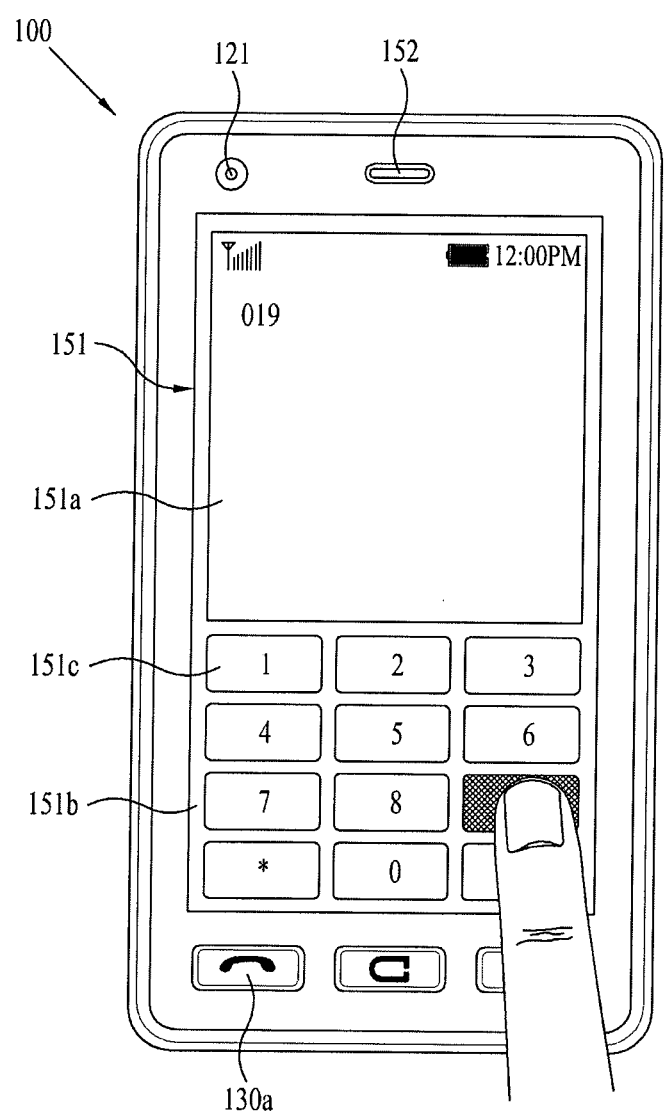
FIG. 3 is a front diagram of a mobile terminal according to one embodiment of the present invention to describe one operational status thereof.

FIG. 3 is a front-view of terminal 100 according to various embodiment of the present invention. First of all, various kinds of visual information can be displayed on the display 151. Such information can be displayed in characters, numerals, symbols, graphics, icons and the like. In order to input the information, at least one of the characters, numerals, symbols, graphics and icons are represented as a single predetermined array to be implemented in a keypad formation. This keypad formation is also referred to as 'soft keys'.

FIG. 3 shows that a touch applied to a soft key is input through a front face of a terminal body. The display 151 is operable through an entire area or by being divided into a plurality of regions. In the latter case, a plurality of the regions can be configured interoperable. For instance, an output window 151a and an input window 151b are displayed on the display 151. A soft key 151c representing a digit for inputting a phone number or the like is output to the input window 151b. If the soft key 151c is touched, a digit corresponding to the touched soft key is output to the output window 151a. If the first manipulating unit 131 is manipulated, a call connection for the phone number displayed on the output window 151a is attempted.

In addition, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

Consider the scenario in which both the display (touch screen) 151 and the touchpad 135 are touched together within a predetermined or threshold time range, thus causing one function of the terminal can be executed. This simultaneous touch example may correspond to a case that the terminal body is held by a user using a thumb and a first finger (clamping). The above function can include activation or deactivation for the display 151 or the touchpad 135.

Meanwhile, such a graphic for pointing at a specific object on a display unit or selecting a menu from the display unit as an arrow, a finger and the like is called a pointer or a cursor. Yet, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical mechanism for performing a touch, a proximity touch, a gesture and the like as a finger, a stylus pen and the like is named a pointer.

For clarity and convenience of the following description, a mobile terminal mentioned in the following description is assumed as including at least one of the components shown in FIG. 1.

Log Information of E-Book & Visualization Thereof

In order to display an e-book, a mobile terminal according to the present invention is configured as an e-book dedicated terminal of which main function is an e-book display/reading. Alternatively, the mobile terminal according to the present invention may be configured to perform various functions including a function of displaying an e-book through application.

According to one embodiment of the present invention, the controller 180 of the mobile terminal providing an e-book reading function creates log information in accordance with a user's e-book reading, visualizes the log information in various forms, and then provides the visualized log information to the user.

Generally, a log indicates such an overall history relevant to mobile terminal operations as a history of an operation of a specific device or module, a situation change, a switch selection, a history of changes of an input/output device, data input via the user input unit 130, a history of particulars of erroneous states and causes and the like. In addition, the log may be saved as a log file in the memory 160.

According to an embodiment of the present embodiment, log information in accordance with an e-book reading conceptionally includes the number of information, which are actively set by a user, such as memos, highlights, bookmarks and the like, a size of each of the information, and information, which is passively recorded, such as a user's reading time, a user's reading frequency and the like. This log information may be recorded by a unit (e.g., page, paragraph, chapter, etc.) of dividing a content that configures an e-book.

For clarity of the following description in this specification, a content dividing unit is assumed as a page for example, by which the present invention is non-limited. Hence, if a page number of a specific content is changed in accordance with such a change of a form as a font type, a font size and the like, a position or shape of visualized log information may be changeable in accordance with the changed page number.

This log information can be created by the controller 180 and saved in the memory 160. Regarding the log information saved in the memory 160, log information on a plurality of e-books is included in one file or a log file may be separately prepared for each e-book.

The log information may be updated by real time/periods. Alternatively, the log information may be updated based on an event. The event-based update may correspond to performing an update of log information each time a predetermined event occurs. For example, the event may include a case that a reading of a specific e-book is ended, a case that a new memo or bookmark is set, or the like.

The controller 180 of the mobile terminal creates and updates the log information on displaying an e-book. If a prescribed command is input, the controller 180 enables the log information to be displayed on the touchscreen 151 by analyzing and visualizing the log information.

According to the present embodiment, when a log information is visualized, an image (hereinafter named a book image) of one portion of a book viewed at a specific angle is displayed on the touchscreen. In addition, a visual effect corresponding to a quantity or quality of the log information is given to a region corresponding to a log information related part of the displayed book image. In doing so, assuming that a book is hexahedral, the angle of viewing the book may preferably include one of 3 facets, on which lateral sides of pages are exposed, except 3 facets (i.e., front facet, rear facet and one lateral facet connecting the front facet and the rear facet) generally blocked by a book cover.

In this instance, the visual effect corresponding to the log information may be displayed in a different form/color on lateral sides of the pages in the book image. For instance, the visual effect may include stains differing from each other in thickness, length or thickness. This idea is conceived based on a natural phenomenon that a color of a lateral edge of a page is changed due to contamination, UV exposure or the like if a specific page of a paper book is read frequently or for long duration. The visual effect given to the lateral sides of the pages may be displayed in length, thickness, color or pattern differing in accordance with a type and quantity of log information. For instance, if a specific page is read more frequently, a stain color of a region corresponding to the page in a book image gets darker. If a reading time of the specific page increases more, a stain length of the corresponding region may increase more.

In this instance, the pattern may include one of a dotted line, a broken line, a solid line, a repetitive/non-repetitive mark and the like. Alternatively, the log information may be visualized in a manner that a memo paper, a label, a bookmark or the like is attached to a lateral side of each page instead of the stain effect.

Meanwhile, the visual effect displayed on the aforementioned book image and the lateral sides of the pages displayed in the book image to correspond to the log information may be displayed together with side information. In this instance, the side information may include a detailed log information, at least one portion of a log information set page, a preview or thumbnail for the at least one portion of the log information set page, a set tag information and the like.

For clarity of the following description, a region, in which a book image and a visualized log information are displayed, is named a log information region and a side information displayed region is named a side information region.

Visualization of Log Information

In the following description, how a log information is visualized and displayed is explained in detail with reference to FIGS. 4A to 4D.

FIGS. 4A to 4D are diagrams for examples of visualized log information and a side information displayed in a mobile terminal according to one embodiment of the present invention.

A screen displayed in each of FIGS. 4A to 4D can be displayed if a prescribed command is input. Alternatively, the screen displayed in each of FIGS. 4A to 4D may be displayed as an initial screen if a reading of a specific e-book is initiated in accordance with a setup. For clarity of the following description, a detailed shape of side information is omitted and a displayed region of the side information is illustrated in the corresponding drawing.

Figure 4A:
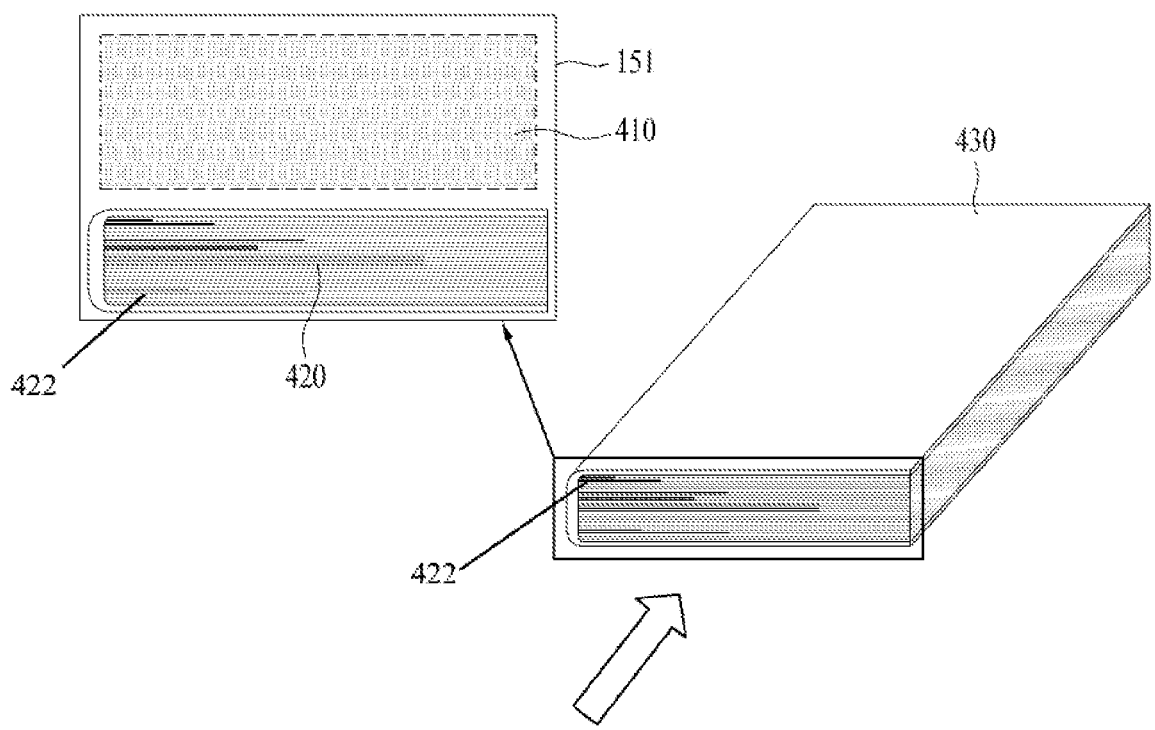
FIGS. 4A to 4D are diagrams illustrating a visualized log information and a side information displayed in a mobile terminal according to one embodiment of the present invention.

Referring to FIG. 4A, a side information region 410 is arranged on a top end of the touchscreen 151 and a log information region 420 is arranged on a bottom end of the touchscreen 151. In doing so, a book image, which looks like a bottom side of a paper book 430 closed and placed horizontally is viewed, is displayed on the log information region 420. In particular, in the book image, a stain corresponding to a log information per page may be displayed in different color, length and thickness.

Figure 4B:
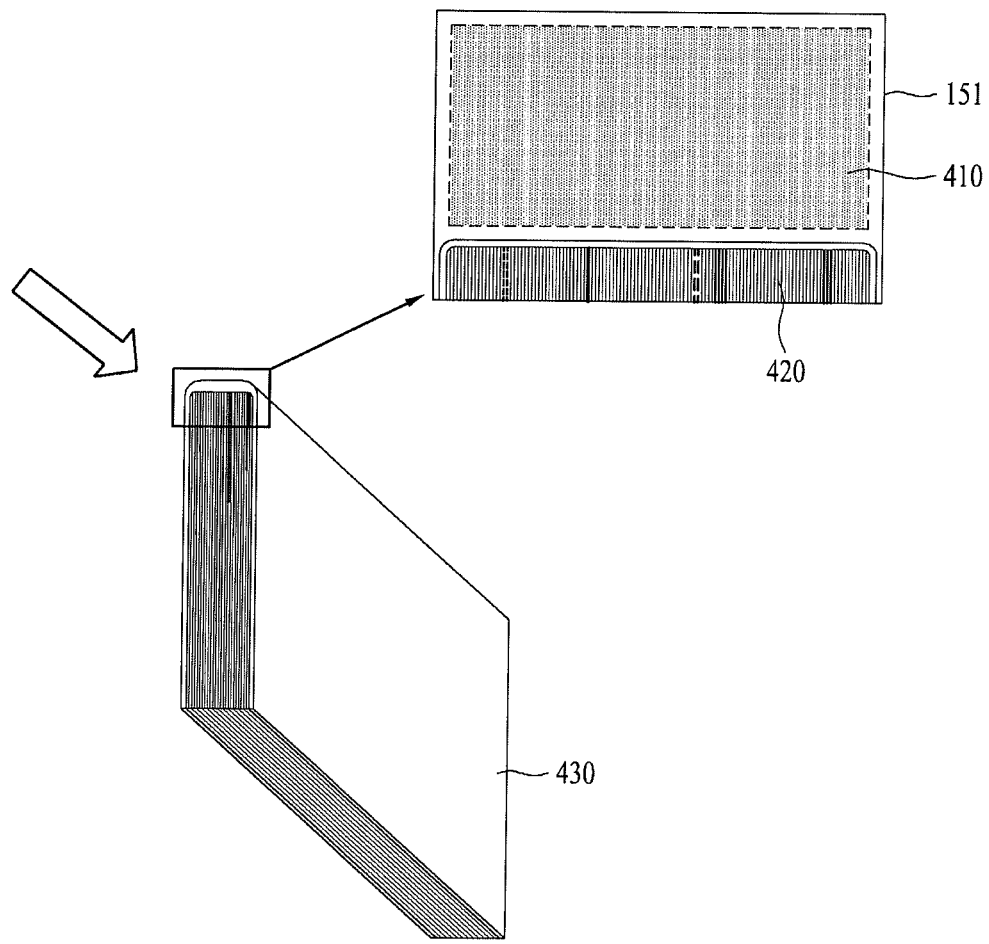

Referring to FIG. 4B, the side information region 410 is arranged on a top end of the touchscreen 151 and the log information region 420 is arranged on a bottom end of the touchscreen 151, which is similar to FIG. 4A. However, FIG. 4B differs from FIG. 4A in that a book image looks like a top end of a bottom side of the paper book 430 closed and placed vertically. In the book image shown in FIG. 4B, a stain corresponding to a log information per page may be displayed in a different color, length and thickness.

In FIG. 4A or 4B, a stain or distinctive marking 422 may be used to represent a reading frequency and a reading time per page. For instance, if a specific page is more frequently used or read, a stain of a region corresponding to the specific page in the book image gets darker. If a reading time of the specific page increases a stain length of the corresponding region may be further increased. Moreover, if such information actively set by a user as a memo, a highlight and the like is included, a different color may be given to the stain in accordance with a type of the information and a thickness of the stain may increase in accordance with a quantity of the actively set information.

Figure 4C:
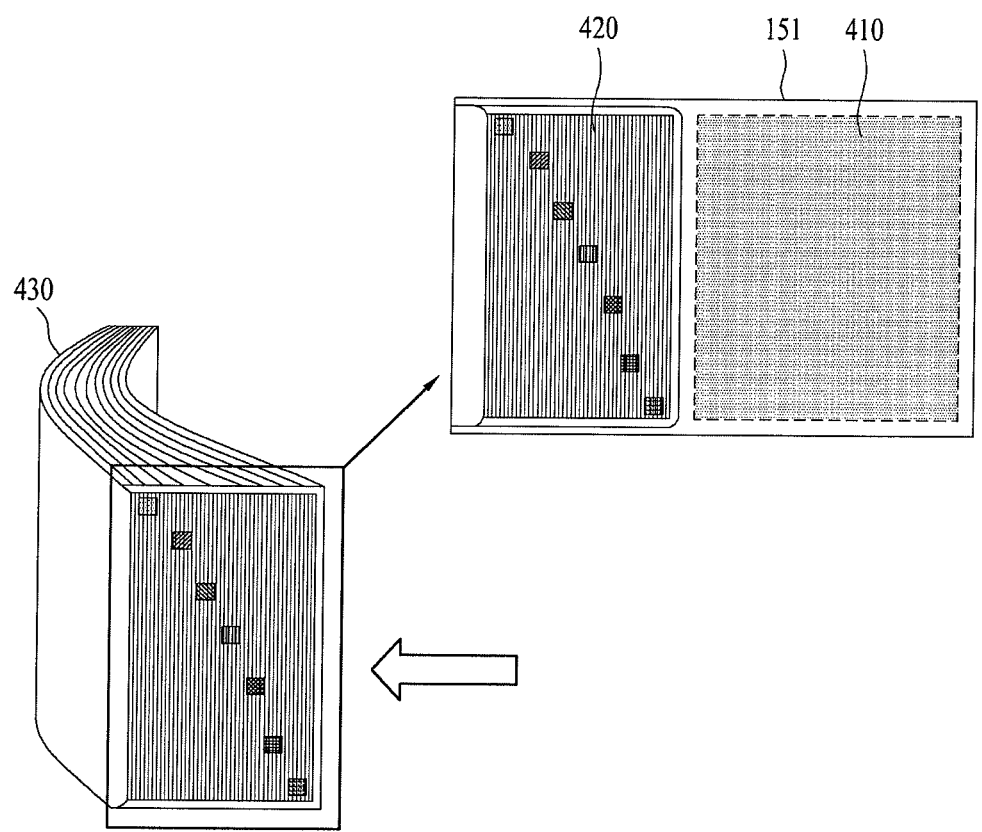

Referring to FIG. 4C, the side information region 410 is arranged on a right side of the touchscreen 151 and the log information region 420 is arranged on a left side of the touchscreen 151. In doing so, a book image is displayed in a manner that pages of the paper book 430 are open to show their lateral sides when the paper book 430 is rolled up. In addition, a visual effect may be given to the book image as if an index tab is attached to a region corresponding to page(s) containing log information.

Figure 4D:
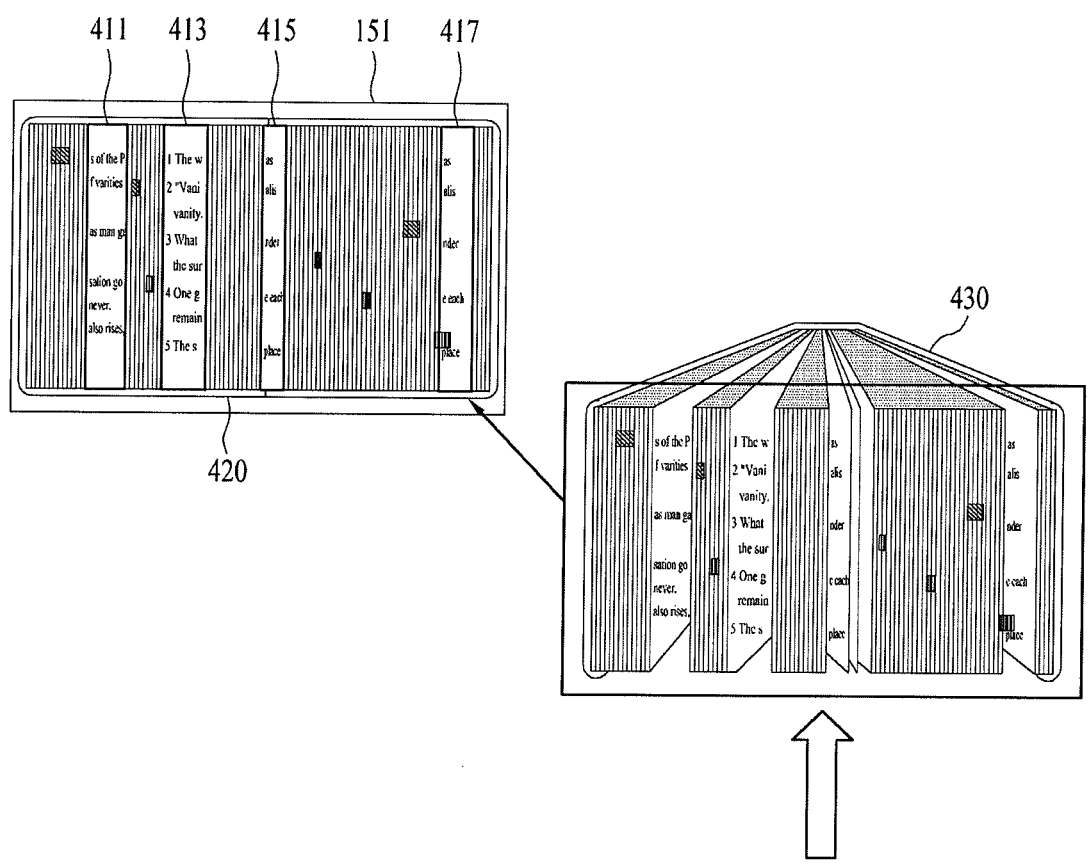

Referring to FIG. 4D, the side information region 410 and the log information region 420 are arranged on the touchscreen 151 in a manner of coexisting without clear region distinction in-between. In particular, a book image is displayed on the log information region 420 in a manner that when a cover of a paper book 430 put upright is half-open, open pages of the paper book 430 are viewed. In addition, a plurality of side information regions 411, 413, 415 and 417 are arranged on regions in which front faces of relatively wide-open pages are partially exposed, respectively. In doing so, if a page has a relatively larger quantity of log information or a greater value of specific log information, an exposed size of a front face of the corresponding page may become larger in the book image. For instance, the higher the reading frequency becomes or the longer a reading time of the page becomes, the wider the corresponding page gets open. Hence, a rate (i.e., a size of the side information region of the corresponding page) of a front face of the corresponding page may increase. Therefore, a user can observe that a relatively considerable amount of log information exists on the pages corresponding to the side information region arranged region in the book image. Optionally, a thumbnail or preview image of a corresponding page may be displayed on each of the side information regions.

In this instance, when a portion of a corresponding page content is displayed on a front face of the exposed page, when the exposed page is situated to the left side centering on the book image, a left side of the front face of the corresponding page may be displayed. When the exposed page is situated to the right side centering on the book image, a right side of the front face of the corresponding page may be displayed. For instance, referring to FIG. 4D, portions of left sides of the front faces of the corresponding pages are displayed on the side information regions 411 and 413 situated on the left side of the center of the book image, respectively. In addition, portions of right sides of the front faces of the corresponding pages are displayed on the side information regions 415 and 417 situated on the right side of the center of the book image, respectively.

Besides, referring to FIG. 4C, in a manner similar to that shown in FIG. 4D, the side information region 410 and the log information region 420 may be arranged on the touchscreen 151 in a manner of coexisting without clear region distinction in-between. In particular, in a book image displayed in a manner that pages of the paper book 430 are open to show their lateral sides when the paper book 430 is rolled up, the open space between the pages is changed in accordance with an extent of the log information. If the changed open space is equal to or greater than a predetermined space, a side information region may be arranged on an exposed front face of the corresponding page.

Side Information Region

In the following description, how various kinds of information are displayed on a side information region is explained in detail with reference to FIGS. 5A to 5D.

Figure 5A:
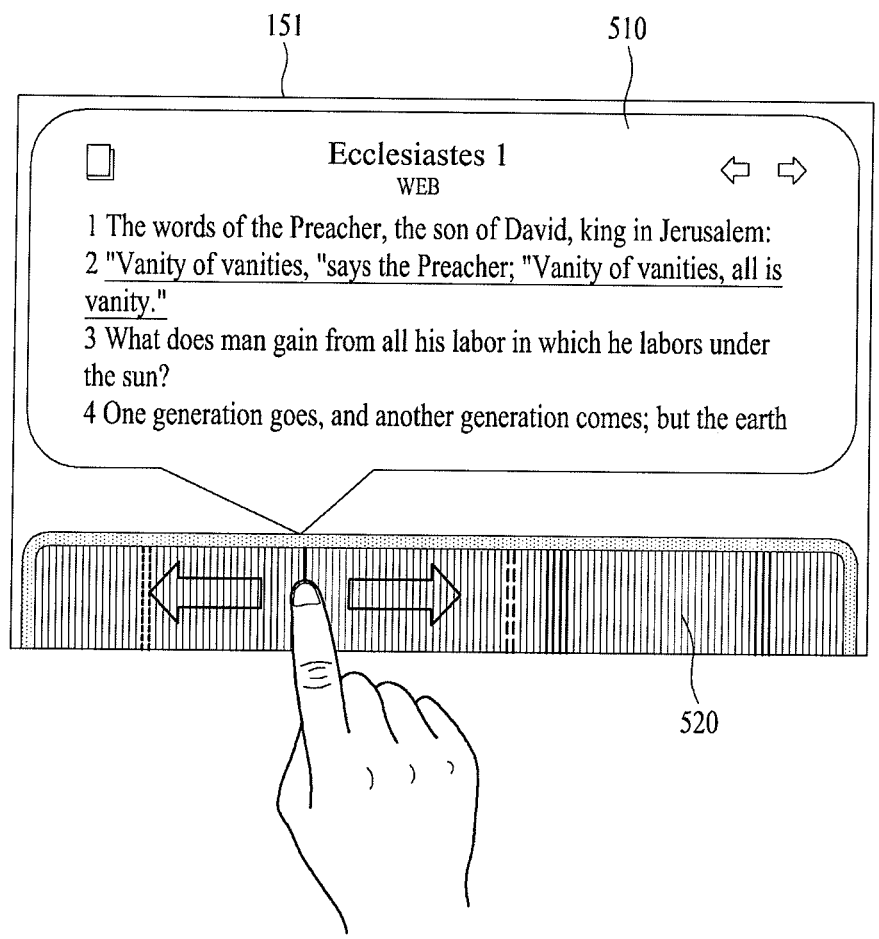
FIGS. 5A to 5D are diagrams illustrating information displayed on a side information region in a mobile terminal according to one embodiment of the present invention.

FIGS. 5A to 5D are diagrams illustrating information displayed on a side information region in a mobile terminal according to one embodiment of the present invention. Referring to FIG. 5A, a side information region 510 and a log information region 520 are displayed in the same manner shown in FIG. 4B. In doing so, a preview of a page corresponding to a region touched with a pointer in a book image of the log information region 520 is displayed on the side information region 510. Via the preview, a partial content of the corresponding page may be displayed together with such a log information actively set up by a user as a highlight, a memo and the like. Moreover, if there is an input of a touch to an arrow icon, a page may be switched to a previous/next page. In there is a flicking touch input or a drag touch input, a page search through a scroll may be performed. Moreover, if there is an input of a touch to a content itself, the corresponding page may be displayed in a reading mode (i.e., a shortcut to the corresponding page may be performed).

Figure 5B:
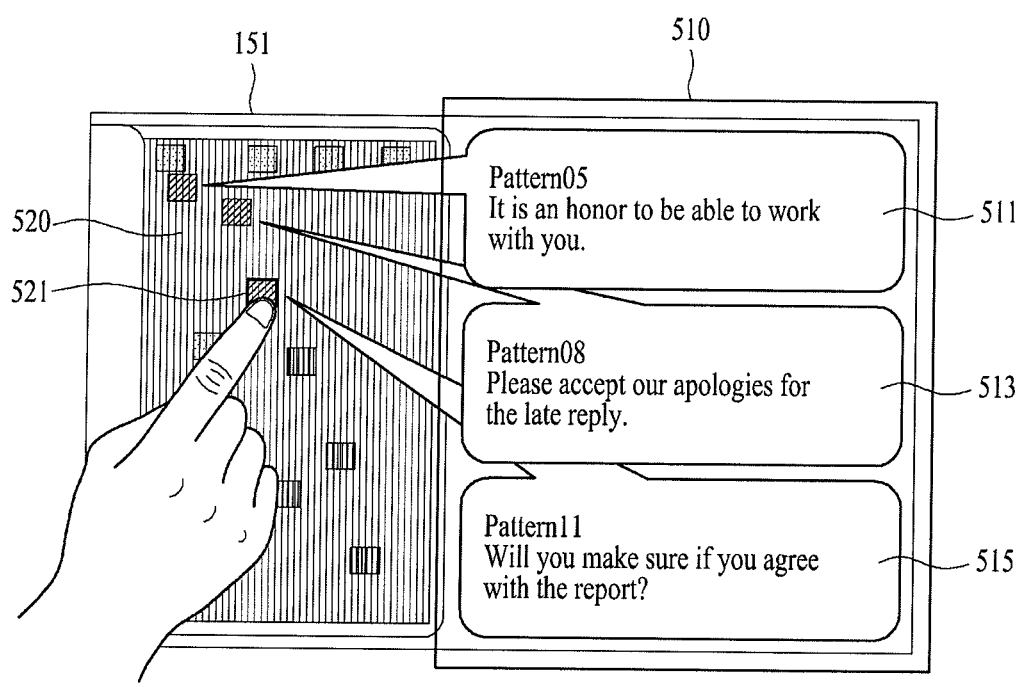

Referring to FIG. 5B, the side information region 510 and log information region 520 are displayed in the same manner shown in FIG. 4C. In doing so, a tag information 515 corresponding to an index tab 521 touched with a pointer in a book image displayed on the log information 520 may be displayed on the side information region 510. In this instance, tag information 511 and 513 corresponding to other tabs of the same category of the touched index tab 521 may be displayed on the log information region 520 together with the tag information 515 corresponding to the touched index tab 521.

Figure 5C:
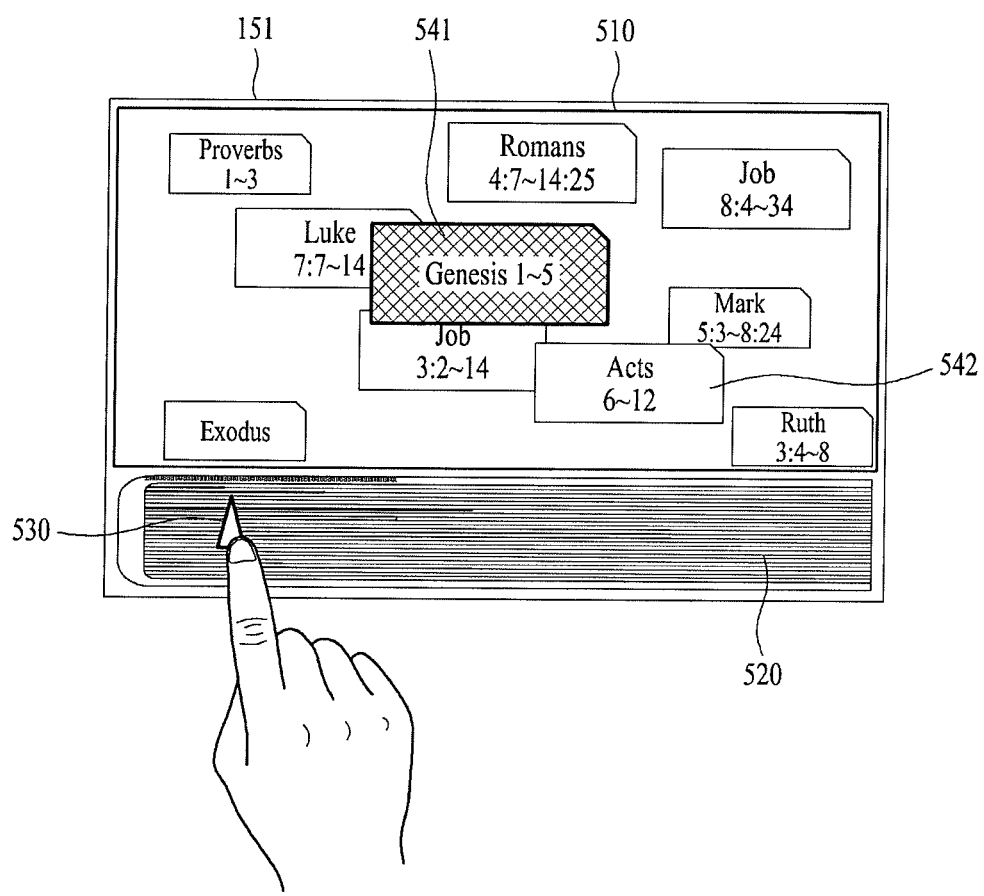

Referring to FIG. 5C, the side information region 510 and log information region 520 are displayed in the same manner shown in FIG. 4A. In doing so, bookmark information 541 and 542 are arranged in the side information region 510. A bookmark set on a frequently read page may be arranged relatively closer to a center of the side information region 510. A cursor 530, of which position may be changeable in accordance with a touch input for a more accurate selection from a book image, may be displayed on the log information 520. In addition, a highlight effect may be given to the book mark 541 corresponding to a page selected via the cursor 530 in the side information region 510.

Figure 5D:
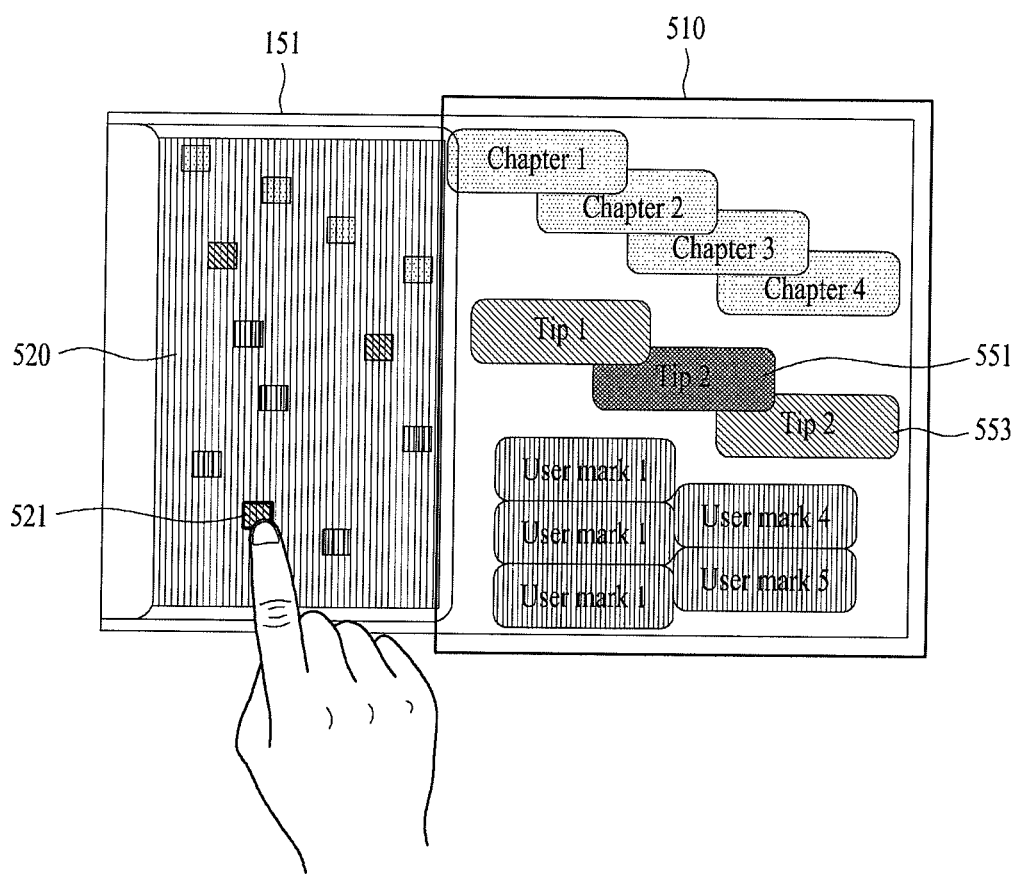

Referring to FIG. 5D, the side information region 510 and log information region 520 are displayed in the same manner shown in FIG. 4C. In doing so, tag information respectively corresponding to index tabs displayed on a book image of the log information region 520 may be displayed on the side information region 510 in a manner of being sorted by a category of the corresponding index tab. In this instance, a highlight effect may be given to the tag information 551 corresponding to the index tab 521 touched with a pointer in the book image of the log information region 520 to visually discriminate the tag information 551 from other tag information 553.

In the following description, various functions provided by changing a shape of a log information region and a shape of a side information region are explained with reference to FIGS. 6 to 7C.

Figure 6:
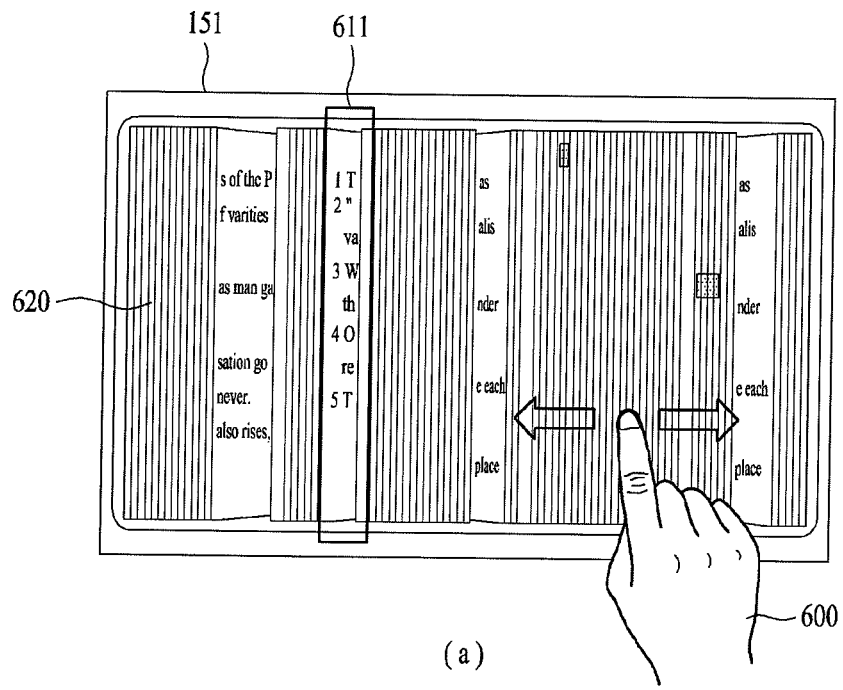
FIG. 6 is a diagram illustrating changing a shape of a side information region in accordance with a touch input in a mobile terminal according to one embodiment of the present invention.
Figure 6:
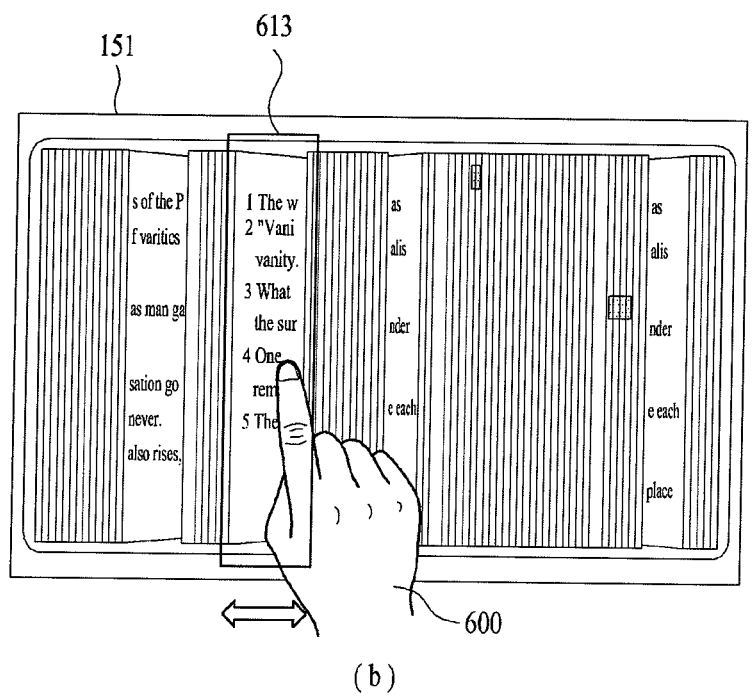

FIG. 6 is a diagram illustrating changing a shape of a side information region in accordance with a touch input in a mobile terminal according to one embodiment of the present invention. Referring to FIG. 6, a side information 611 and a log information region 620 are displayed in the same manner shown in FIG. 4D.

Referring to FIG. 6(*a*), as mentioned in the foregoing description, if a page having a larger quantity of log information (i.e., a page has information frequently read by a user or information added more by a user), an exposed rate of a front face of a page in the log information region 620 increases higher. In particular, if a page has more log information, a larger side information region is allocated.

If a user inputs a touch to a book image in the log information 620 with a pointer 600, an open rate of the touch input part may be raised by a prescribed rate (i.e., a side information region of the corresponding page may increase). For instance, if a user applies a touch input to a specific side information region 611 using the pointer 600, referring to FIG. 6(*b*), a corresponding side information region 613 may be extended by a prescribed rate. As the side information region is extended, more side information can be displayed on the extended region. Hence, a user can check the information on the corresponding page more conveniently. If the touch input is cancelled, a size of the extended side information region may return to its original size. Hence, if the pointer sequentially moves in horizontal direction on the pages of the book image via a touch & drag input, the pages coming into contact with the pointer may be displayed in a manner of being sequentially opened and closed as if a paper book is actually drawn with a finger.

In the following description, when a log information is visualized and displayed, a method of checking a whole content of a page is explained with reference to FIGS. 7A to 7C.

Figure 7A:
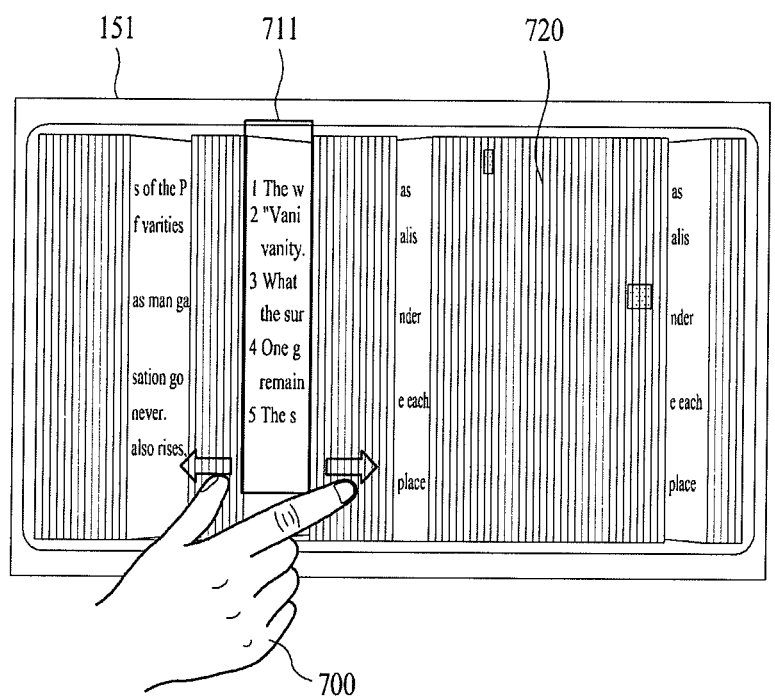
FIGS. 7A to 7C are diagrams illustrating a process for checking a page having a side information region allocated thereto in accordance with log information in a mobile terminal according to one embodiment of the present invention.
Figure 7B:
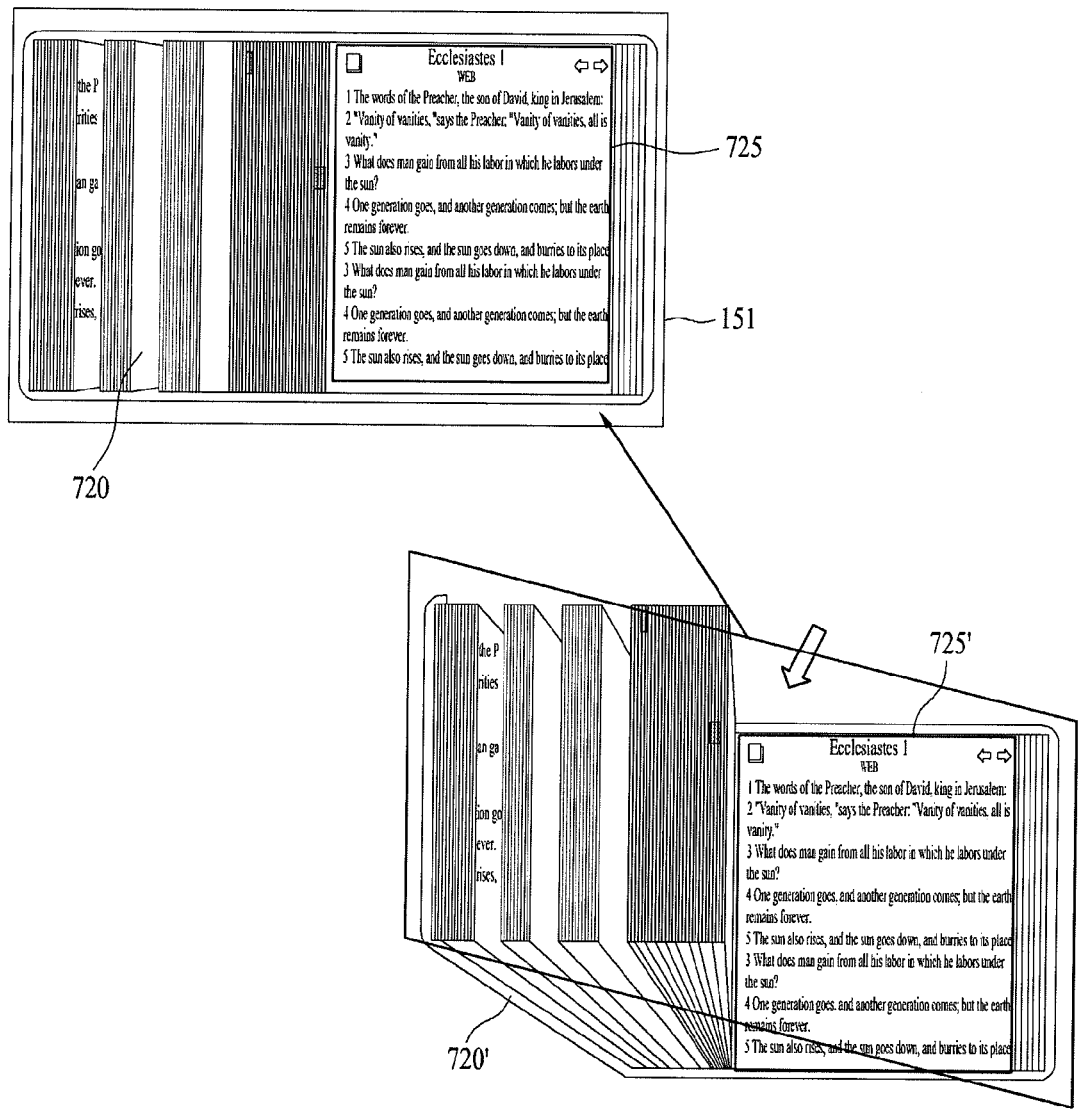
Figure 7C:
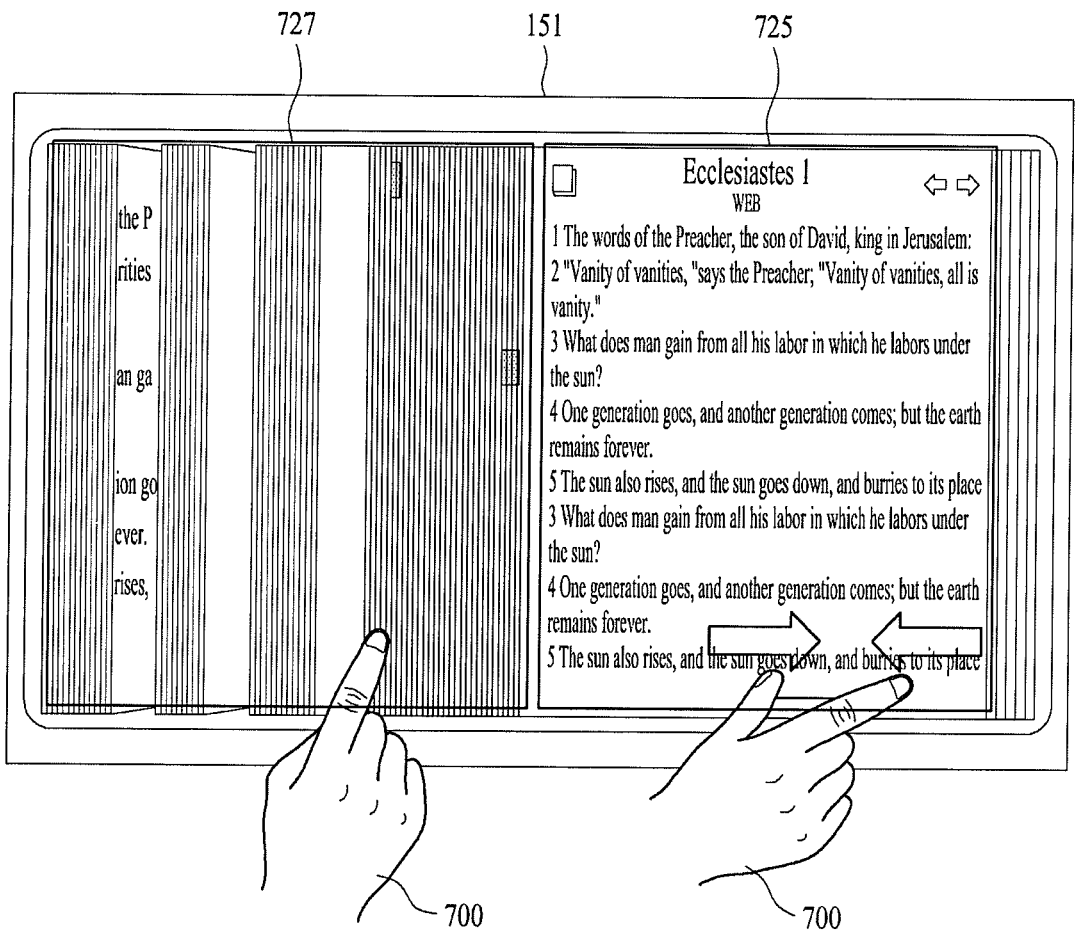

FIGS. 7A to 7C are diagrams illustrating a process for checking a page having a side information region allocated thereto in accordance with log information in a mobile terminal according to one embodiment of the present invention. Referring to FIG. 7A, a side information 711 and a log information region 720 are displayed in the same manner shown in FIG. 4D. If a user applies a multi-touch & drag input to the side information region 711 using a pointer 700 in a manner of increasing a space between the initially touched two touch points, referring to FIG. 7B, a whole content 725 of a page corresponding to the clamped or reduced side information region may be displayed on a right side of a book image.

In particular, the book image may have the following configuration. First of all, a corresponding page 725' and next pages of a paper book 720' are fully open on a right side. Secondly, the rest of the pages of the paper book 720' on a left side maintain the previously open shape. When a flicking touch is input to the left/right on the whole content 725 of the corresponding page, a whole content of a page previous or next to the corresponding page may be displayed on the same region.

Under the circumstance shown in FIG. 7B, if a multi-touch & drag input is applied to the whole content of the corresponding page using the pointer 700 by decreasing the space between the initially touched two touch points, the book image may return to the state shown in FIG. 7A. Moreover, as shown in FIG. 7C, when a touch input is applied to a region 727 on which the rest of the pages on the left side of the book image are displayed, the book image may return to the state shown in FIG. 7A.

Meanwhile, if a long touch input is applied to the side information region 711 shown in FIG. 7A instead of the above-mentioned touch & drag input, the corresponding page may be displayed in a normal reading mode.

Sorting Via Log Information

A method of sorting pages of an e-book using log information and a method of changing a configuration of an e-book using log information will now be explained with reference to FIGS. 8 and 9.

Figure 8:
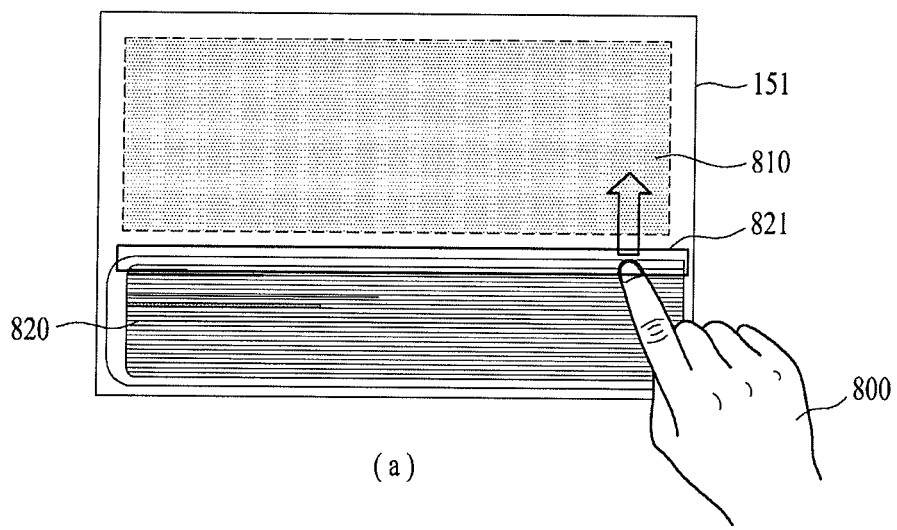
FIG. 8 is a diagram illustrating a method of sorting pages of an e-book in accordance with a log information in a mobile terminal according to one embodiment of the present invention.
Figure 8:
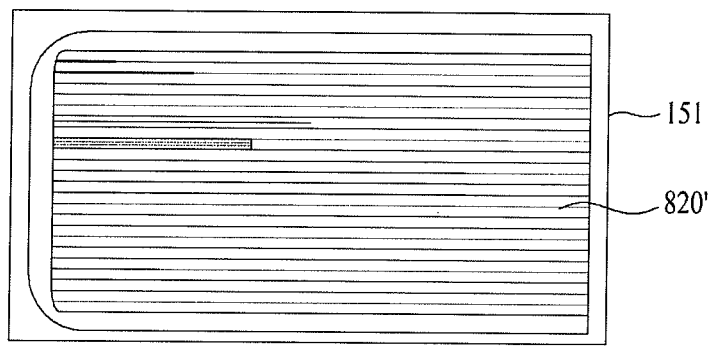
Figure 8:
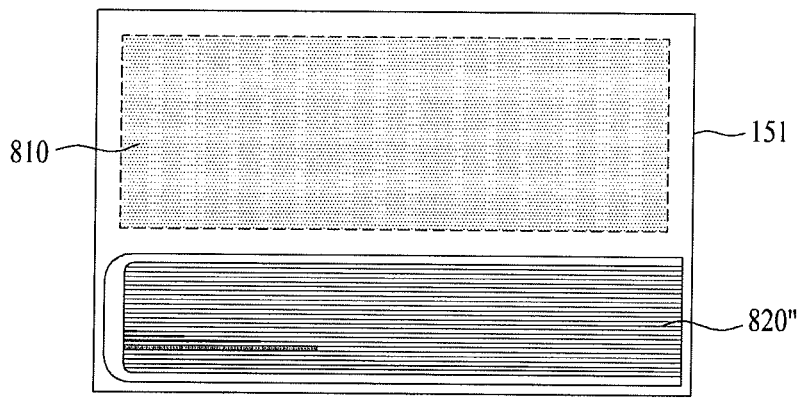

In particular, FIG. 8 is a diagram illustrating a method of sorting pages of an e-book in accordance with a log information in a mobile terminal according to one embodiment of the present invention. Referring to FIG. 8, a side information region 810 and a log information region 820 are displayed in the same manner shown in FIG. 4A. Assume that a reading frequency and a reading time are visualized per page on a book image in the log information region 820 using stain patterns differing from each other in thickness and length.

If a user drags a front book cover 821 of the book image upward (FIG. 8(a)), the book image 820' extends upward in proportion to a drag distance. Hence, the side information region may be reduced or disappear. When the drag distance exceeds a predetermined distance (i.e., the book image extends over a predetermined size), if the user cancels the drag touch input, a size of the book image may gradually return to the size shown in FIG. 8(a) (FIG. 8(c)). Hence, the side information region 810 may be displayed again. In doing so, the pages displayed on the book image 820'' may be re-sorted in accordance with the lengths of the stain patterns.

In particular, if the page has a longer stain pattern, the corresponding page may be sorted on a lower side.

Meanwhile, instead of using the method of enlarging and reducing the book image (FIG. 8), the log information based page sorting may be performed when the mobile terminal is provided with a gyro sensor or an acceleration sensor capable of sensing a motion or shaking of the mobile terminal. Preferably, a type of the log information as a sorting reference and a sorting direction may be set in advance. Moreover, if the log information based sorting is set to be performed in the event that the sensor provided mobile terminal is shaken, a log information of a different type may be selected as a sorting reference in accordance with a direction of the shaking (e.g., side-by-side, top-to-bottom, etc.).

Therefore, a user may experience a sense as if a heavy substance falls down to the bottom in the first place when substances differing from each other in weight are lifted up and down or shaken altogether.

Figure 9:
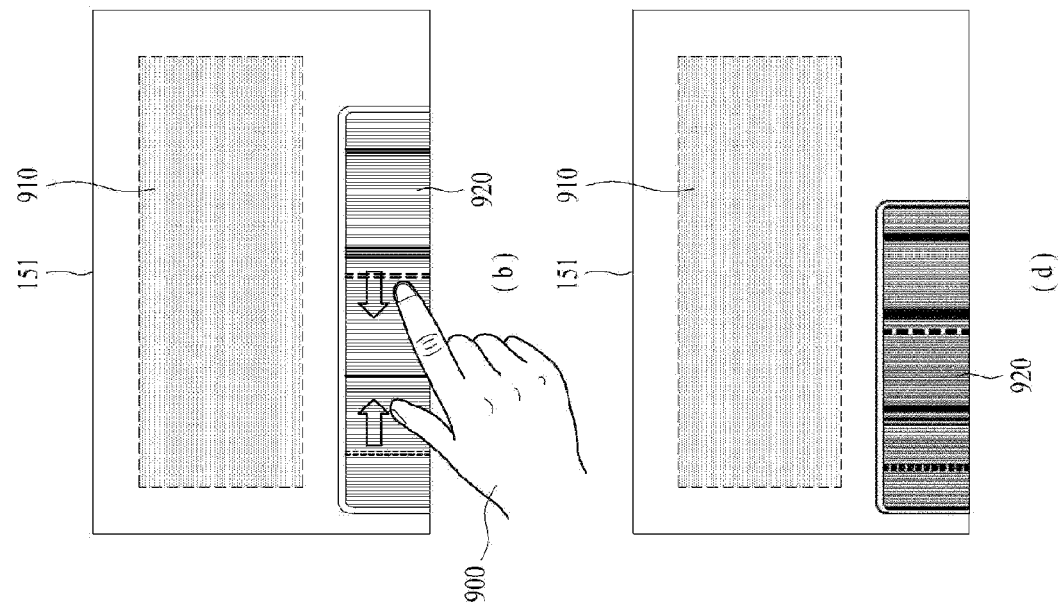
FIG. 9 is a diagram illustrating a method for changing a configuration of an e-book in accordance with a log information in a mobile terminal according to one embodiment of the present invention.
Figure 9:
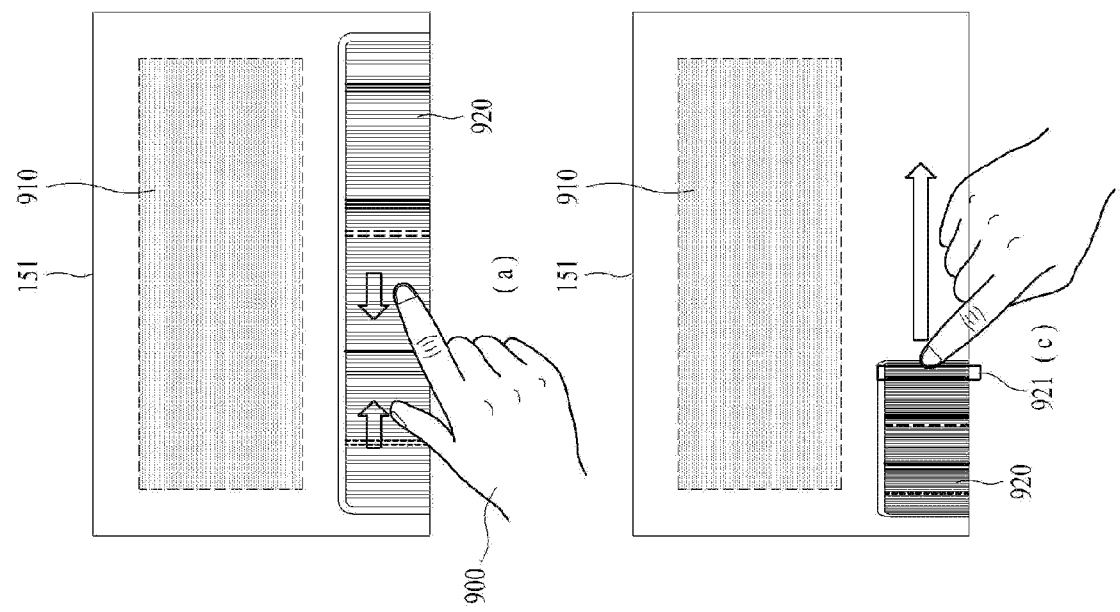

FIG. 9 is a diagram illustrating a method for changing a configuration of an e-book in accordance with a log information in a mobile terminal according to one embodiment of the present invention. Referring to FIG. 9, a side information region 910 and a book image are displayed in the same manner shown in FIG. 4B. Assume that a reading frequency and a reading time are visualized per page on the book image in a log information region 920 using stains differing from each other in thickness and pattern.

If a multi-touch & drag input with a pointer 900 is applied in a manner of narrowing down a space between two touch points (FIG. 9(a)), the book image is compressed in proportion to a distance of the drag input (FIG. 9(b)). In doing so, the compression may be performed in direction of excluding a page having a low specific log information value (e.g., a reading frequency) from the book image.

If a user applies the multi-touch & drag input with the pointer 900 to the compressed book image again (FIG. 9(b)), the book image is compressed again in proportion to a distance of the drag input (FIG. 9(c)). In this instance, the pages remaining in the initially compressed book image by the process shown in FIG. 9(a) are excluded in order of a lower reading frequency in proportion to the drag distance.

Once the book image 920 has the configuration shown in FIG. 9(c) owing to the two compressions, the pages having low reading frequencies are excluded and the pages having high reading frequencies remain in the book image only. If the user shifts a book cover part 921 to a lateral side by applying a touch & drag input, a size occupied by the pages remaining in the twice-compressed book image may increase in proportion to a corresponding drag distance (FIG. 9(d)). After the sizes of the pages have increased, the user is able to select a specific page more conveniently and may check a side information of the selected page via the side information region 910.

Through the process described with reference to FIG. 9, a user may reconfigure pages of an e-book in accordance with a value of a specific log information and select a specific page conveniently by changing a size of the re-configured e-book.

Meanwhile, although FIG. 9 shows that the compression is performed in a manner of excluding a page having a low log information value, the compression may be performed in a manner of excluding a page having a high log information value.

Moreover, using information of the pages reconfigured in accordance with the log information values, it may be able to newly create an e-book file including pages that not excluded in the event of compression.

Meanwhile, the aforementioned log information may be shared with another user (or another mobile terminal) via SNS (social network service), a general P2P file transmission or a dedicated server.

Moreover, touch inputs of the specific patterns in the embodiments of the present invention are exemplary and may be substituted with or changed into inputs of other patterns or hardware key button inputs.

Accordingly, the present invention provides the following effects and/or advantages.

First of all, a user can read an e-book more conveniently via a mobile terminal according to at least one embodiment of the present invention.

Secondly, a user is able to perceive an e-book reading history as visual information of various types.

Thirdly, a user is able to re-sort or re-arrange contents of an e-book in accordance with an e-book reading history using a relatively simple input.

According to one embodiment of the present invention, the above-described methods can be implemented in a program recorded medium as processor-readable codes. The processor-readable media include all kinds of recording devices in which data readable by a processor are saved. The processor-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a wireless communication unit configured to wirelessly communicate with at least one other terminal;
a display unit including a touchscreen; and
a controller configured to:
display on the display unit a log information region representing page edges of an e-book executed on the mobile terminal,
determine a variable characteristic of the executed e-book including at least one of 1) a number of times prescribed pages of the e-book have been displayed, and 2) an amount of time spent displaying the prescribed pages of the e-book, and
distinctively mark the page edges of the e-book in accordance with the determined variable characteristic of the executed e-book,
wherein the distinctively marked page edges of the e-book include a variable length along the page edges that changes in accordance with the determined variable characteristic of the executed e-book,
wherein the distinctively marked page edges further have a darker color indicating a greater number of times the prescribed pages of the e-book have been displayed, and a longer length indicating a greater amount of time spent displaying the prescribed pages of the e-book, and
wherein the controller starts to distinctively mark page edges from a spine of the e-book and the marked page edges extends towards the open end of the e-book as an amount of time spent displaying the prescribed pages of the e-book gets greater, and
wherein when the displayed page edges of the e-book are compressed along the thickness direction in response to a user input, the controller is further configured to excluding at least one page from the e-book in order of a lower reading frequency in proportion to the extent of the compression.

2. The mobile terminal of claim 1, wherein the controller is further configured to display on the display unit an information region including partial or full contents of a selected page of the log information region or bookmarks set in the e-book.

3. The mobile terminal of claim 2, wherein the information region and the log information region represent an image of the e-book.

4. The mobile terminal of claim 1, wherein the log information region represents an edge of the e-book in a closed state.

5. The mobile terminal of claim 4, wherein the edge of the e-book corresponds to the e-book being laid horizontally on a surface or being laid vertically on the surface.

6. The mobile terminal of claim 1, wherein the distinctively marked edges of the e-book include index tabs representing a section of pages of the e-book.

7. The mobile terminal of claim 2, wherein the information region and the log information region are displayed separately from each other or are intermixed with each other.

8. The mobile terminal of claim 2, wherein the controller is further configured to change a width of the information regions based on an inward or outward touch and drag operation on the information regions.

9. The mobile terminal of claim 1, wherein the controller is further configured to sort the distinctively marked edges of the e-book according to the determined variable characteristic of the executed e-book.

10. The mobile terminal of claim 1, wherein the controller is further configured to:
receive a touch and drag action on the log information region, and
change a dimension of the log information region based on the received touch and drag action, and
wherein a received touch and drag inward action compresses the page edges of the log information region and a received touch and drag outward action expands the page edges of the log information region.

11. A method of controlling a mobile terminal, the method comprising:
allowing, via a wireless communication unit, wireless communication with at least one other terminal;
displaying, via a display unit including a touchscreen, a log information region representing page edges of an e-book executed on the mobile terminal;
determining, via a controller of the mobile terminal, a variable characteristic of the executed e-book including at least one of 1) a number of times prescribed pages of the e-book have been displayed, and 2) an amount of time spent displaying the prescribed pages of the e-book; and
distinctively marking, via the controller controlling the display unit, the page edges of the e-book in accordance with the determined variable characteristic of the executed e-book, wherein the distinctively marked page edges of the e-book include a variable length along the page edges that changes in accordance with the determined variable characteristic of the executed e-book, wherein the distinctively marked page edges further have a darker color indicating a greater number of times the prescribed pages of the e-book have been displayed, and a longer length indicating a greater amount of time spent displaying the prescribed pages of the e-book, wherein the step of distinctively marking page edges starts from a spine of the e-book and extends towards the open end of the e-book as an amount of time spent displaying the prescribed pages of the e-book gets greater, and wherein when the displayed page edges of the e-book are compressed along the thickness direction in response to a user input, the method further comprises excluding at least one page from the e-book in order of a lower reading frequency in proportion to the extent of the compression.

12. The method of claim 11, further comprising:
displaying, via the display unit, an information region including partial or full contents of a selected page of the log information region or bookmarks set in the e-book.

13. The method of claim 12, wherein the information region and the log information region represent an image of the e-book.

14. The method of claim 11, wherein the log information region represents an edge of the e-book in a closed state.

15. The method of claim 14, wherein the edge of the e-book corresponds to the e-book being laid horizontally on a surface or being laid vertically on the surface.

16. The method of claim 11, wherein the distinctively marked edges of the e-book include index tabs representing a section of pages of the e-book.

17. The method of claim 12, wherein the information region and the log information region are displayed separately from each other or are intermixed with each other.

18. The method of claim 12, further comprising:
changing, via the controller, a width of the information regions based on an inward or outward touch and drag operation on the information regions.

19. The method of claim 11, further comprising:
sorting, via the controller, the distinctively marked edges of the e-book according to the determined variable characteristic of the executed e-book.

20. The method of claim 11, further comprising:
receiving a touch and drag action on the log information region, and
changing a dimension of the log information region based on the received touch and drag action,
wherein a received touch and drag inward action compresses the page edges of the log information region and a received touch and drag outward action expands the page edges of the log information region.

* * * * *